(12) United States Patent
Naimo

(10) Patent No.: US 7,973,762 B2
(45) Date of Patent: Jul. 5, 2011

(54) CHARACTER INPUT USING MULTIDIRECTIONAL INPUT DEVICE

(75) Inventor: Douglas Andrew Naimo, Portland, OR (US)

(73) Assignee: Triggerfinger Software, Inc., Portland, OR (US)

( * ) Notice: Subject to any disclaimer, the term of this patent is extended or adjusted under 35 U.S.C. 154(b) by 943 days.

(21) Appl. No.: 11/673,514

(22) Filed: Feb. 9, 2007

(65) Prior Publication Data
US 2007/0205983 A1    Sep. 6, 2007

Related U.S. Application Data

(60) Provisional application No. 60/779,358, filed on Mar. 6, 2006.

(51) Int. Cl.
*G09G 5/00* (2006.01)
(52) U.S. Cl. ......................................................... 345/156
(58) Field of Classification Search ........... 345/156–167
See application file for complete search history.

(56) References Cited

U.S. PATENT DOCUMENTS

| | | | |
|---|---|---|---|
| 5,543,818 A * | 8/1996 | Scott ............................. | 345/168 |
| 6,069,614 A | 5/2000 | Singhal | |
| 6,288,709 B1 | 9/2001 | Willner et al. | |
| 6,356,258 B1 * | 3/2002 | Kato et al. ..................... | 345/168 |
| 6,486,870 B1 * | 11/2002 | Kozu ............................. | 345/157 |
| 6,756,968 B2 | 6/2004 | McAlindon | |
| 6,760,013 B2 | 7/2004 | Willner et al. | |
| 6,773,325 B1 | 8/2004 | Mawle et al. | |
| 6,812,940 B2 * | 11/2004 | Arnold .......................... | 715/817 |
| 7,052,396 B2 | 5/2006 | Comair | |
| 7,151,525 B2 | 12/2006 | McAlindon | |
| 7,171,498 B2 * | 1/2007 | Tu et al. ........................ | 710/73 |
| 7,395,081 B2 * | 7/2008 | Bonnelykke Kristensen et al. ......................... | 455/550.1 |
| 2001/0003713 A1 | 6/2001 | Willner et al. | |
| 2002/0093535 A1 | 7/2002 | Murphy | |
| 2003/0197736 A1 | 10/2003 | Murphy | |
| 2004/0008186 A1 | 1/2004 | McAlindon | |
| 2004/0227728 A1 | 11/2004 | McAlindon | |
| 2006/0040737 A1 | 2/2006 | Comair | |

OTHER PUBLICATIONS

"JoyToKey English Version," <http://www.electracode.com/4/joy2key/JoyToKey%20English%20Version.htm>, 3 pages, accessed on Jan. 15, 2007.
"JoyToKey," <http://www.oneswitch.org.uk/2/I/JoyToKey/JoyToKey.htm>, 4 pages, accessed on Jan. 15, 2007.
"Quikwriting Version 1.0, using Palm OS HackMaster," <http://mrl.nyu.edu/~perlin/demos/quikwriting-prc.html>, 4 pages, accessed on Jan. 19, 2007.
Triggerfinger Software User's Guide, Jun. 2006, 7 pages.

(Continued)

*Primary Examiner* — Regina Liang
*Assistant Examiner* — Tom V Sheng
(74) *Attorney, Agent, or Firm* — Klarquist Sparkman, LLP

(57) ABSTRACT

Character information is input into a computing device using one or more multidirectional keys, such as an analog stick, a multidirectional button, or a d-pad. The complete collection of desired characters can be divided into character sets. Each of these sets can then be associated with one input value of one of the multidirectional keys, such as, for example, the d-pad. Selecting a value (such as up) then selects one of the character sets. Another multidirectional input device, such as an analog stick, can then be used to choose one of the characters within the chosen character set. The chosen character is then displayed.

21 Claims, 15 Drawing Sheets

OTHER PUBLICATIONS

Triggerfinger Software, Product Overview, Sep. 13, 2006, 21 pages.
Tirggerfinger Software, Product Overview, May 15, 2006, 24 pages.

Triggerfinger Software, Keyboard Design for Enhanced Mobile Communications, May 26, 2006, 15 pages.

* cited by examiner

Software 180 Implementing Multidirectional
Key Character Input

1400

| | | |
|---|---|---|
Input 1 — n/a

| tT | aA | nN |
|---|---|---|
| iI |  | eE |
| rR | oO | sS |

1405

Input 1 — Circle

| cC | hH | pP |
|---|---|---|
| lL |  | dD |
| .> | mM | uU |

1410

Input 1 — Cross

| gG | bB | fF |
|---|---|---|
| yY |  | wW |
| kK | vV | xX |

1415

Input 1 — Square

| \| | jJ | /? |
|---|---|---|
| zZ |  | qQ |
| '" | ,< | ;: |

1420

Input 1 — Triangle

| 1! | 2@ | 3# |
|---|---|---|
| 4$ |  | 6^ |
| 7& | 8* | 9( |

CHARACTER INPUT USING MULTIDIRECTIONAL INPUT DEVICE

CROSS REFERENCE TO RELATED APPLICATIONS

This application claims the benefit of U.S. Provisional Application No. 60/779,358, filed Mar. 6, 2006, which is incorporated herein in its entirety.

FIELD

The field relates generally to providing data entry for a computing device.

BACKGROUND

Text input devices have been used since Gutenberg's invention of moveable type. With the invention of typewriters, average people could produce documents that appeared printed. The typewriter interface, namely in the form of the QWERTY keyboard has since been used as the main form of communication with a computer. However, not all computing devices have a keyboard. For example, gaming systems are often only equipped with a gaming controller. Even if a keyboard is provided on a small computing device, size restrictions may make the keyboard difficult to use. Keyboard-free methods to input text are often time-consuming and clumsy. For example, gaming systems sometimes include the capacity to scroll through the alphabet to choose a letter. Typing in a single word can be quite time-consuming. Other systems provide a virtual keyboard. To use, the user must point to and select each letter that is typed. Again, this is too clumsy to use for any but the most limited text input. Other methods, such as chording, have been proposed. Chording requires pressing multiple buttons simultaneously. Aside from the problem that most game controllers do not accept chording input, this type of input tends to be counterintuitive and difficult to use.

Thus, there is a need for systems and methods to input character information without using a standard keyboard.

SUMMARY

In an exemplary embodiment, systems and methods are provided that allow a user to enter character information using one or more multidirectional key inputs. The desired characters can be divided into character sets. The alphabet, for example, can be divided into three character sets, each associated with eight letters. Each of these sets can then be associated with a multidirectional input such as a d-pad, or a directional key, each of which traditionally has four inputs (top, bottom, right, left) which allow a user to enter directional input. Selecting a value (such as top) then selects one of the character sets. Another multidirectional input device, such as an analog stick (which traditionally moves in at least eight directions—north, south, east, west, and diagonals), can then be used to enter one of the eight characters. This allows characters to be input quickly using simple inputs.

In another embodiment, a single multidirectional input device, such as an analog stick or a joystick, is used to enter text, using predictive text or multitap methods.

The foregoing and other objects, features, and advantages of the invention will become more apparent from the following detailed description, which proceeds with reference to the accompanying figures.

BRIEF DESCRIPTION OF THE DRAWINGS

FIG. 14 is a block diagram of exemplary character sets that can be selected using two multidirectional keys inputs.

DETAILED DESCRIPTION

Overview of Technologies

The technologies described herein can be used in any of a variety of scenarios in which character input is useful and which can be enabled using multidirectional keys. For example, computer game players who play with a game controller that does not include a keyboard can use such methods to input text and other characters.

As another example, text may need to be entered into a computer when the user may not have access to a keyboard and may not be able to see the input device. For example, a police officer may have one or more multidirectional keys on an easily-accessible device in a squad car, such as a steering wheel. The officer may then be able to enter important information such as a car license plate number using the multidirectional keys without taking his or her eyes off of the road; and/or without removing his or her hands from the steering wheel.

A head-mounted display with motion sensors could be used to enter text. The user could input characters by moving his or her head in the appropriate direction.

As yet another example, text may need to be entered with very little hand motion, such as for a device that will be used for people with limited mobility.

As a further example, computer screens on airplanes could be equipped with multidirectional keys. A user could then access email or otherwise access a computer associated with the screen using the multidirectional keys.

Example 1

Exemplary Computing Environment

Figure 1:
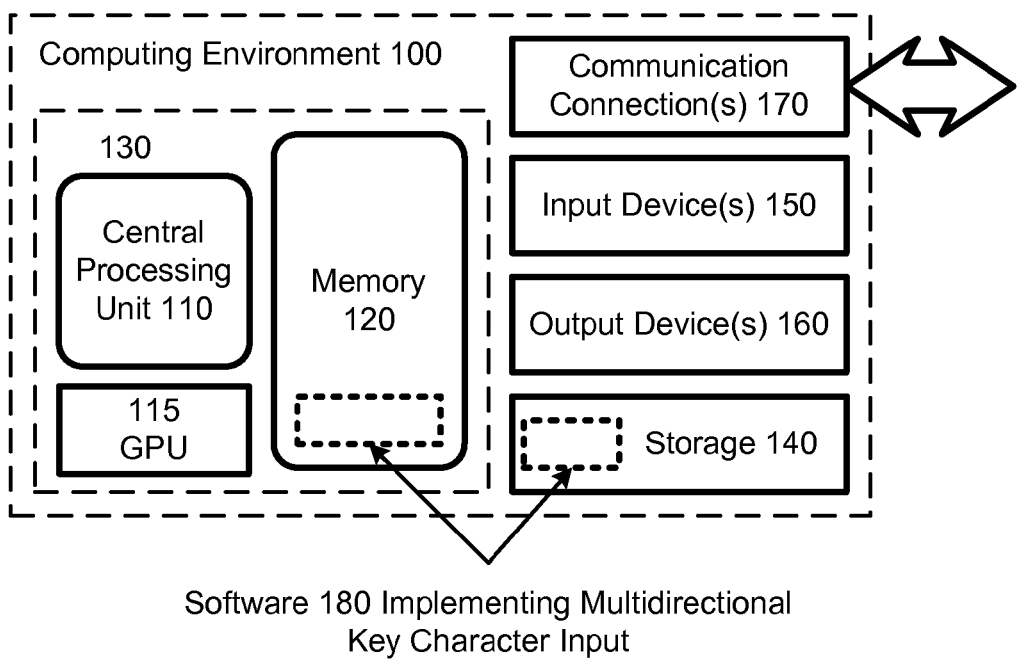
FIG. 1 is a block diagram illustrating an exemplary computing environment for implementing the multidirectional character input as taught herein.

FIG. 1 and the following discussion are intended to provide a brief, general description of an exemplary computing environment in which the disclosed technology may be implemented. Although not required, the disclosed technology can be implemented with computer-executable instructions being executed by a computer such as personal computer (PC), a specialized gaming computer, or other computing device including portable ones such as those found in hand-held devices such as TV remote controllers, cell phones, and the like. Generally, program modules include routines, programs, objects, components, data structures, etc., that perform particular tasks or implement particular abstract data types. Moreover, the disclosed technology may be implemented with other computer system configurations, including multi-processor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

FIG. 1 illustrates a generalized example of a suitable computing environment 100 in which described embodiments may be implemented. The computing environment 100 is not intended to suggest any limitation as to scope of use or functionality of the technology, as the present technology may be implemented in diverse general-purpose or special-purpose computing environments.

With reference to FIG. 1, the computing environment 100 includes at least one central processing unit 110 and memory 120. In FIG. 1, this most basic configuration 130 is included within a dashed line. The central processing unit 110 executes computer-executable instructions and may be a real or a virtual processor. In a multi-processing system, multiple processing units execute computer-executable instructions to increase processing power and as such, multiple processors can be running simultaneously. The computing environment 100 may also include a graphics processing unit (GPU) 115, which assists in creating or speeding up graphics processing and display. Memory 120 may be volatile memory (e.g., registers, cache, RAM), non-volatile memory (e.g., ROM, EEPROM, flash memory, etc.), or some combination of the two. The memory 120 stores software 180 implementing the described methods for inputting characters using a multidirectional input device. A computing environment may have additional features. For example, the computing environment 100 includes storage 140, one or more input devices 150, one or more output devices 160, and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which can be used to store information and which can be accessed within the computing environment 100. The storage 140 stores instructions for the software 180 implementing methods for inputting characters using multidirectional input mechanisms.

The input device(s) 150 may be a touch input device, such as a keyboard, mouse, pen, or trackball, a voice input device, a scanning device, or another device, that provides input to the computing environment 100 such as a gaming pad, a joystick, a dance pad, or a nonstandard device such as one or more multidirectional input devices working together used for character input. For audio, the input device(s) 150 may be a sound card or similar device that accepts audio input in analog or digital form, or a CD-ROM reader that provides audio samples to the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal.

Computer-readable media are any available media that can be accessed within a computing environment 100. By way of example, and not limitation, with the computing environment 100, computer-readable media include memory 120, storage 140, communication media (not shown), and combinations of any of the above.

Example 2

Exemplary Input Device

Figure 2:
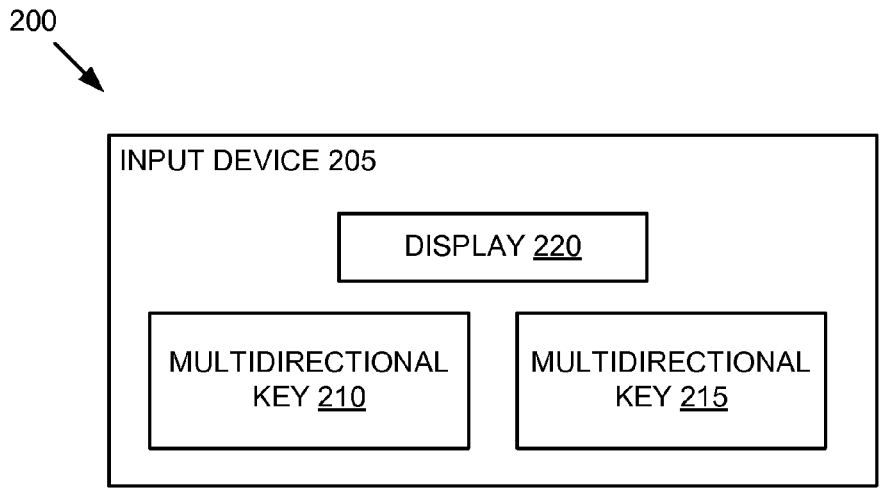
FIG. 2 is a block diagram of an exemplary system to display characters using multidirectional inputs.

FIG. 2 shows an exemplary system 200 for inputting characters using an input device 205 which has at least one multidirectional input key 210, 215 which can be used to input characters, as taught herein. The input device 205 may be a game pad, a non-standard input device such as a glove with at least one multidirectional key mounted thereon, a cell phone, a household appliance, a steering wheel, a device mounted on a wheelchair, and so forth. The input keys 210, 215 can be any input key that accepts multidirectional data, as described herein.

The input device may use a multidirectional input key such as a d-pad. An example of a d-pad, also called a directional pad, is shown with reference to FIG. 3. d-pads 300 were originally designed to allow input in the directions north, west, south, and east, and typically consist of a cross with four buttons 305, 310, 315, 320, one in each of the cardinal directions North, West, South, and East. Pushing the appropriate button, such as 305, moves a game token in that direction, such that pushing the North button 305 would move North.

The input device may also use one or more multidirectional (or rocker) keys. A multidirectional key can be pushed or pressed in different ways to achieve different results. For example, the key could be pushed straight down or rocked in a number of directions. Some rocker keys accept rocking up and down (as is found on some cell phones). Other rocker keys allow rocking in four directions (up, down, left, right).

The input device may also use a multidirectional key such as an analog stick. An example of an analog stick is shown with reference to FIG. 4. An analog stick 400 (sometimes called a "thumbstick," or "control stick") is a raised "stick" or button which can be manipulated or pushed in a number of directions, typically eight, the cardinal directions North, West, South, and East, plus NE, NW, SW and SE, as shown. Pushing the button from the "home" position (typically in the middle) to one of the directions can be considered data input. Analog sticks can have more or less than eight possible input positions. For example, some analog sticks also have a central "enter" button, activated, typically, by pushing down. Other analog sticks allow many more possible input values.

Figure 5:
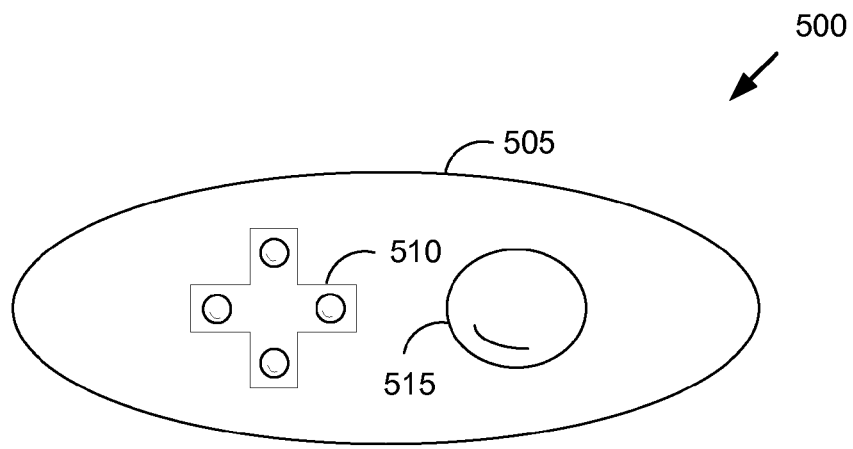
FIG. 5 is a diagram of an exemplary input device which can be used to input characters using multidirectional inputs.

FIG. 5 at 500 shows another example of an exemplary system for inputting characters using a game pad 505. The game pad 505 has, as its multidirectional keys 210, 215 (FIG. 2) a d-pad 510 and an analog stick 515.

Figure 6:
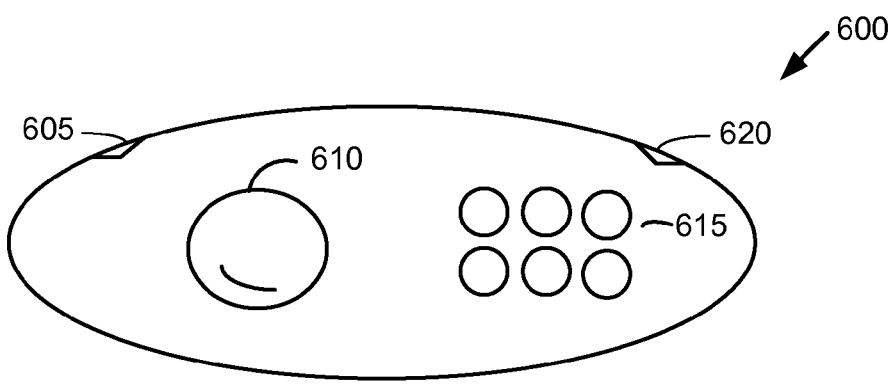
FIG. 6 is a diagram of an exemplary input device which can be used to input characters using multidirectional inputs.

An array of buttons may be used as an input device. For example, FIG. 6 shows an input device 605 that uses an analog stick 610 and an array of six buttons 615 for input. Other numbers of buttons may be used for a button array, such as an array of four buttons. The buttons need not be placed together. For example, a system may have shoulder buttons 605, 620, specialized buttons such as "home" and fire buttons, and the like. Some or all such buttons may be used separately or in groups as a multidirectional input device.

Figure 7:
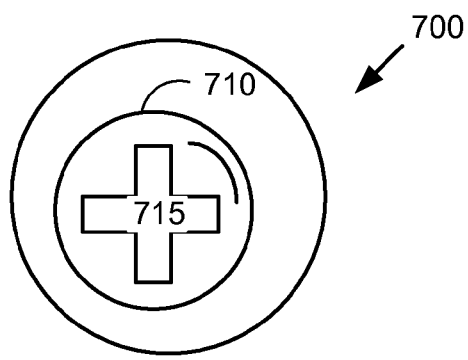
FIG. 7 is a diagram of an exemplary analog stick-d-pad input device that can be used to input characters using multidirectional inputs.

The multidirectional keys 210, 215 (FIG. 2), can be different portions of the same input device 700, such as is shown in FIG. 7, where an analog stick 710 has a d-pad 715 mounted on it. Such a device could be used to enter data with one hand, for example.

Example 3

Figure 8:
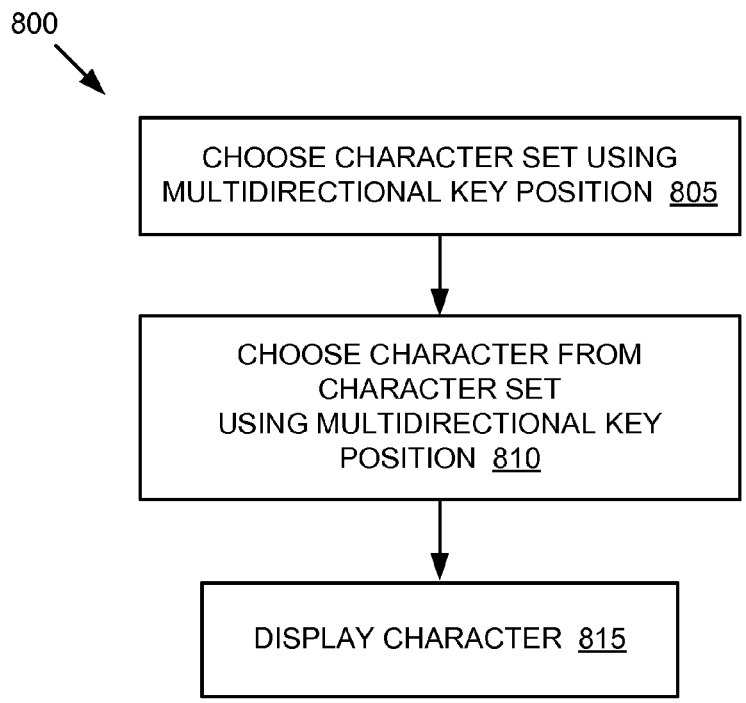
FIG. 8 is a flowchart of an exemplary method for using multidirectional keys to determine a character set and from there a character using multidirectional inputs.

Exemplary Method for Using Multidirectional Input Keys to Generate at Least One Character FIG. 8 shows an exemplary method 800 for selecting and displaying a character (or a series of characters) using at least one multidirectional input key. This method may be performed, for example, by the system of FIG. 2.

At some point, character entry input is triggered. This may be done automatically, at, for example, a certain point in a game, or may be done manually, by, for example, selecting a "text" button associated with the system, selecting a "text input" portion of a screen, selecting a menu, and so on. Some input devices may have a multidirectional key that is used exclusively for character input.

At 805, a character set is selected using a position of the multidirectional input key. Applications often need input. The type of input applications accept can be dependent upon the type of input device available. For example, applications which do not typically have space for keyboards tend to not allow character input. Gaming applications often have gamepads which dynamically and efficiently allow dimensional input (up, down, left, right, and so forth.) However, such controllers do not generally have keyboards associated with them. Entering character data using the gaming console typically is clumsy and time-consuming. Similarly, other applications which could conceivably use character input have not been developed, as there has been no good way to enter characters without the use of large input devices such as keyboards, touchscreens and the like. The embodiments taught herein discuss ways to enter characters, such as words, numbers, and the like, using simple multi-directional controls such as those found on typical computer gamepads, such as d-pads and analog sticks.

The universe of possible characters may be partitioned into a number of character sets, each set of a reasonable size. For example, the 26 characters of the English alphabet can be partitioned into four groups of eight characters each, with a few spare locations. The number of sets to partition the characters into may be chosen by using the number possible positions on a multidirectional key (or keys) that will be used for the input. As an exemplary embodiment, and with reference to FIG. 5, a game controller 505 with a d-pad with four positions 510 and a analog stick/joystick with 8 positions 515 may be used for the character input. The d-pad 510 may be used to choose which character set will be chosen. As an example, and with reference to FIG. 9, the possible characters may be divided into four sets 905, 910, 915, 920, such that each of the d-pad's inputs can select one of the sets. The North input 1 (305, FIG. 3) can be used to select character set 1 905, and so forth. Some embodiments include a help function that displays on, for example, a display 220 (FIG. 2) the individual character sets that can be chosen.

In some embodiments, a help screen appears which shows which character set has been chosen; and what positions of a second input will lead to specific characters. For example, character set 1 905 could be displayed on a computer screen after the North input 1 (305, FIG. 3) was selected. When head-mounted displays are used, a character set could be displayed unobtrusively, in, for example, the upper left corner of the field of vision, thereby not blocking too much of the view.

Figure 10:
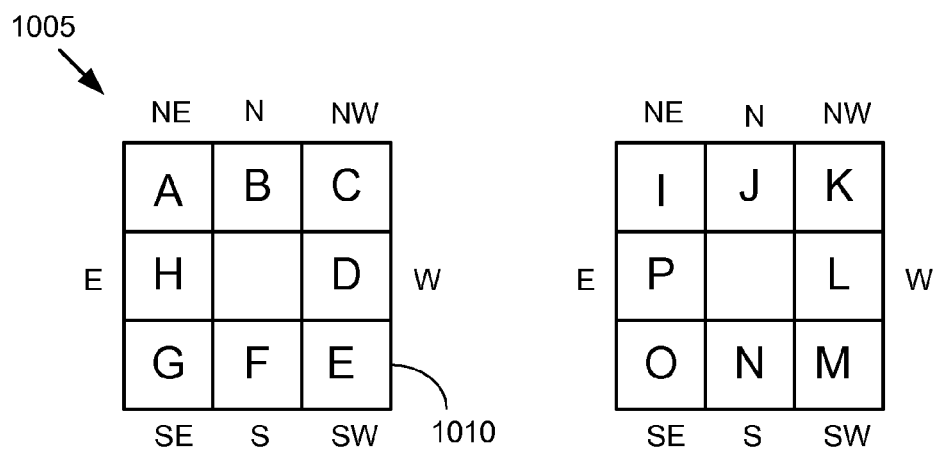
FIG. 10 is a block diagram of exemplary character sets, showing characters that can be chosen using certain multidirectional inputs.
Figure 10:
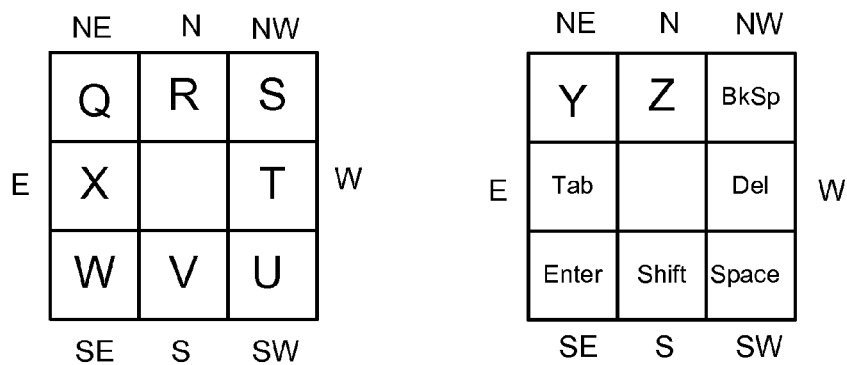

At 810, a character is chosen from the character set using a multidirectional key, such as the multidirectional keys 210, 215 (FIG. 2). A possible partition of the English alphabet into four character sets is shown in FIG. 10. Each of these character sets can graphically represent the character chosen by a particular input. For example, if the gamepad 500 (FIG. 5) is used for character input, the d-pad (510 in FIG. 5) could be used for the first multidirectional key input 805, with the analog stick (515 in FIG. 5) used for the second multidirectional key.

Figure 3:
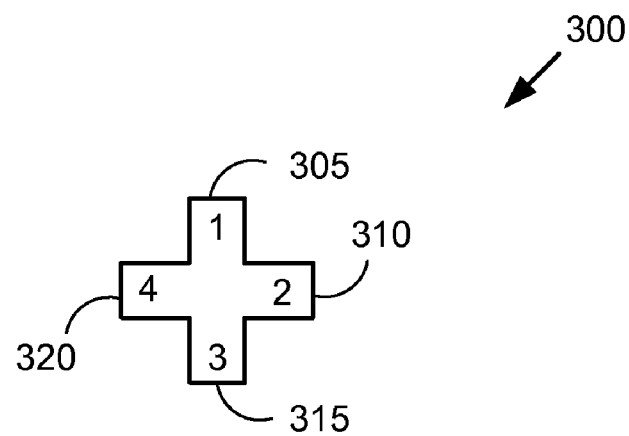
FIG. 3 is a diagram of an exemplary d-pad that can be used to input and display characters using multidirectional inputs.
Figure 4:
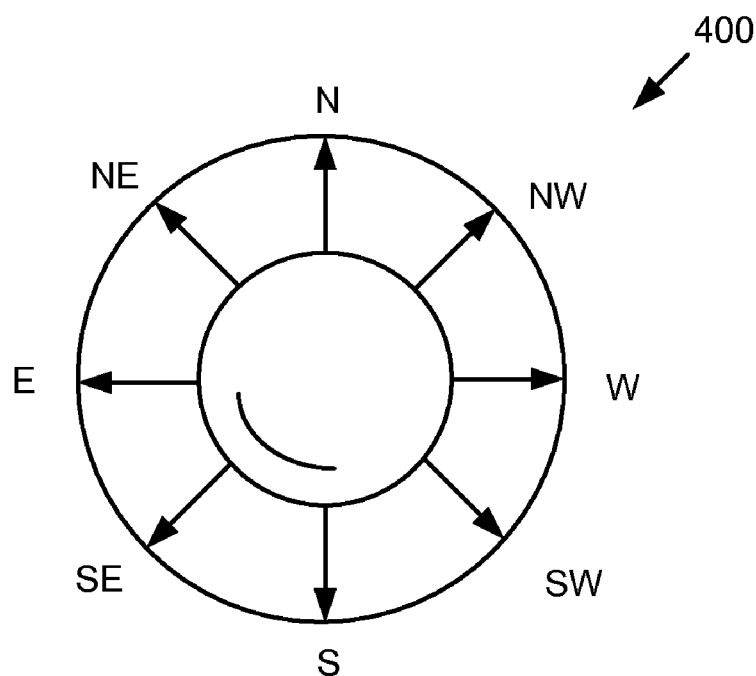
FIG. 4 is a diagram of an exemplary analog stick which can be used to input characters using multidirectional inputs.
Figure 9:
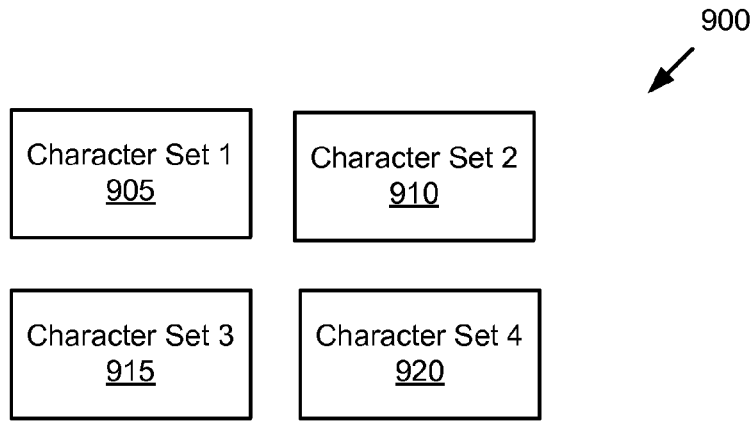
FIG. 9 is a block diagram of exemplary character sets, one of which can be chosen using multidirectional keys, such as those shown in FIGS. 3 and 4.

To select the character "A", a user could select position 1 305 (FIG. 3) on the d-pad 510 (FIG. 5). This would select character set 1 905 (FIG. 9.) Then, to select an "A", the user could push the analog stick 515 (FIG. 5) into the NE position as shown in FIG. 4. This would choose the character "A" as shown at 1005 in FIG. 10. To choose the character "S", the user would first select character set 3 by selecting position 3 on the d-pad 510. Then, the user selects the SW position using the analog stick. In some embodiments, the same multidirectional key is used for both inputs 210, 215 (FIG. 2).

The character set selection 805 and the character selection 810 can be done separately, such that the same hand (or even the same finger) can do all the input. For example, the left index finger can select a d-pad button, then the left thumb can select an analog stick position, choosing a character.

At 815, the chosen character is displayed. The character may be displayed on a display screen, may be printed, may be written to a file, may be emailed, or may be otherwise noted such that it can be read or viewed contemporaneously or at a later date.

Example 4

Exemplary Multidirectional Keys

Figure 11:
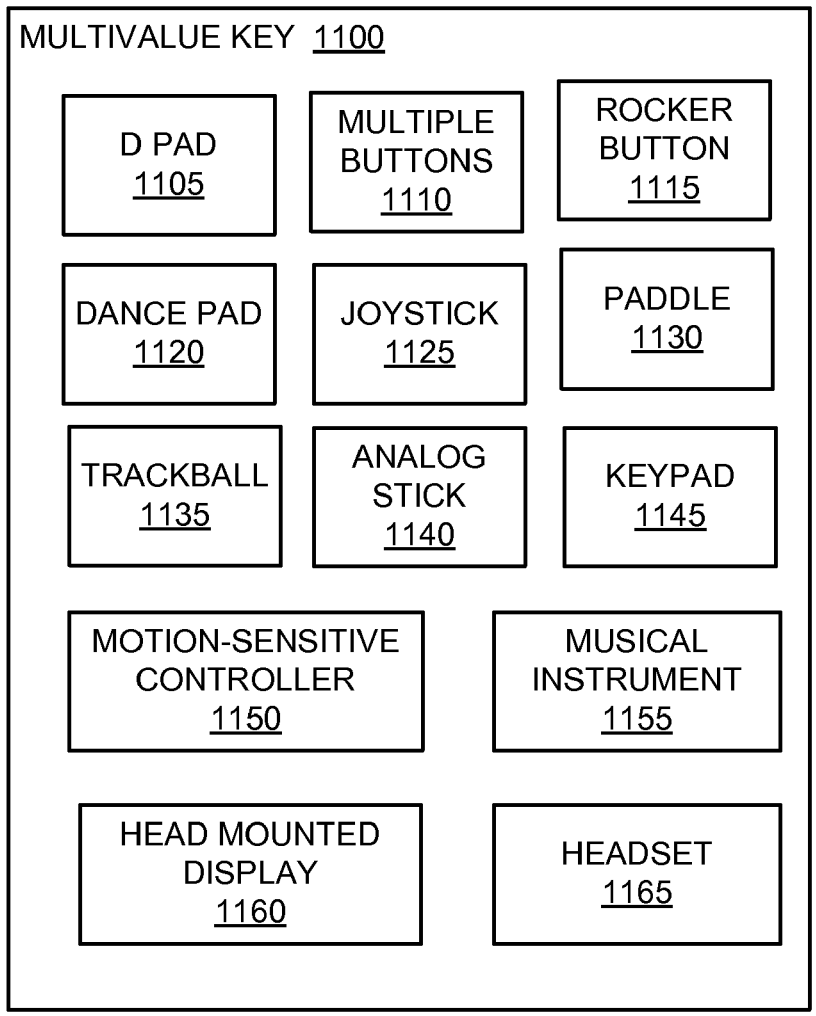
FIG. 11 is a block diagram of exemplary multidirectional keys that can be used for input.

FIG. 11 shows exemplary multidirectional keys 1100 (or input devices) that may be used in any of the examples herein for inputting characters. Even though the term "input device" is used, it should be understood that a collection of input devices, such as an array of buttons, can be used for multidirectional input. The input devices allowable should not be considered limited to any of the embodiments taught herein, rather any input device that allows multiple possible inputs to define a single input value should be allowed.

A d-pad 1105 that is typically used to move in space (such as north, south, east, west) may be used as a multidirectional key. FIG. 3 at 300 shows an exemplary d-pad. The d-pad may have four pressure-sensitive buttons 305, 310, 315, 320 arranged in a cross shape, as shown. Some d-pad have sticky buttons such that a button remains pressed until another button is pressed releasing the first button. Multiple buttons 1110 may be used for a single input; the specific button pressed defines the input. A d-pad may also have more or less than four buttons, and the buttons may be arranged in a shape other than a cross.

A rocker button 1115 (also known as a directional key) or a series of rocker buttons may be used to define an input. Rocker buttons allow multiple inputs using a single key or button. For example, a rocker button may rock forward (one input) and back (another input.) Multi-directional rocker buttons may allow four inputs, forward, back, left and right. Some rocker buttons may also allow a fifth input—pressing straight down.

Dance pads 1120, also known as dance mats or dance platforms, are increasingly being used to play video games. Dance pads are large pads, set on the floor or on a platform that register inputs when stepped on. Such pads often have 4, 6, 8, or 9 inputs, arranged similar to the d-pad or analog stick inputs shown in FIG. 4. These may be used for multidirectional inputs, such as, for example, when playing dance games. Pads similar to dance pads, in that they accept "foot" input may be used for input in situations where it is impractical to use hands.

Joysticks 1125 may also be used for input. Joysticks are similar to analog sticks, except that they are usually larger, in that they are designed to be gripped by a hand. They also are generally large enough that they may have attached buttons. Any of the joystick positions and/or buttons may be used for multidirectional input.

Paddles 1130 are input devices with one or more wheels and one or more buttons, generally used to "fire" during game play. These can be used as multidirectional input devices, with the location of the paddle wheel, for instance, indicating the value.

Trackballs 1135 and analog sticks 1140 can also be used for mutivalue input, as can a keypad 1145. A limited number of keys may be designated as the multidirectional keys, which would then allow, for example, someone with limited movement to choose, for example, alphabetic characters using only, say, four or eight keys.

A motion-sensitive controller 1150, which may be a wireless controller, may also be used as an input device. Certain games and teaching devices allow musical instruments 1155 to provide input directly into a computing system. Such musical instruments can be used as a multidirectional input device, with different notes or chords, for example, equivalent to different input values. Drum input may be indicated by which percussion instrument is played, which part of a percussion instrument is played, and so forth.

A head-mounted display 1160, may also be used as an input device. Head-mounted displays mount display screens directly in front of someone's eyes. Such displays can show data derived from an outside source, such as a computer, or can augment a person's own vision. For example, a doctor wearing a display 1160 can view medical information, such as CAT scans superimposed upon an actual patient. In the gaming world, a game character could be seen walking across the (real) floor. Such head mounted displays often have position sensors attached. Head-mounted displays can be used in flight simulators; as, for example, night vision goggles. In virtual reality environments, head mounted displays can be used to provide three dimensional vision. As another example, a hands-free embodiment can comprise a system with three portions: a computer screen mounted infrared camera, one or more head-mounted reflectors, and a touch pad. When the user activates character input, the character sets 1214 (FIG. 12) may appear on the computer screen. The user can then choose the desired character set 1214, such as by moving a cursor which is activated by head movement. Once the cursor is over the desired character set 1214, the set can be selected (such as by the method 1304 in FIG. 13) by a single selection key, such as a mouth-activated device, which can be activated by blowing or biting. Once the character set is displayed, an individual character can then be chosen from the set (such as by the method 1308 in FIG. 13) again using a combination of head-movement and the single selection key. Thus, the multidirectional device comprises both the character set display and the single selection key. This can let someone with extremely limited mobility operate a computer.

Certain headsets 1165 may also be used as an input device if the headset has position sensors, allowing the user to signal a direction through head movement.

Example 5

Figure 12:
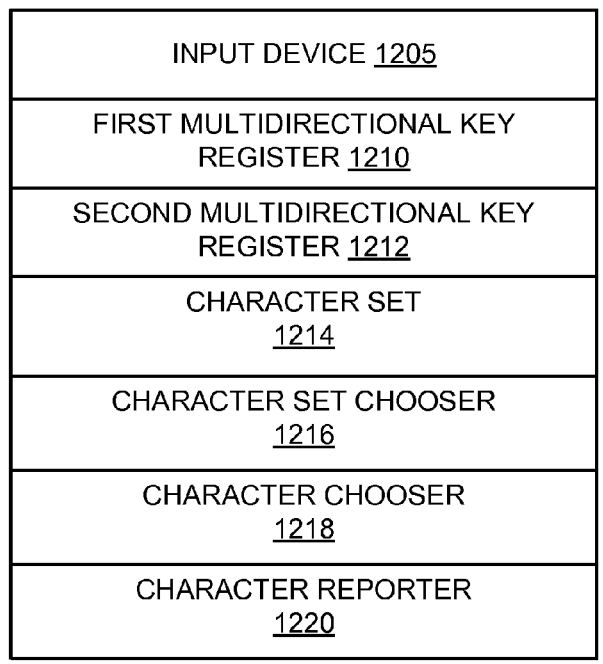
FIG. 12 is a block diagram of an exemplary system to input characters using multidirectional keys.

Exemplary System to Input and Display Characters Using Multidirectional Inputs FIG. 12 shows an exemplary system 1200 to input and display characters using multidirectional input devices. An input device 1205 has a connection to a computer such as computing environment 100 (FIG. 1). A first multidirectional key register 1210 registers that a value has been chosen. The multidirectional key may be any of the multidirectional input devices discussed herein, such as the input devices described with reference to FIG. 11. A second multidirectional key register 1212 can be used to register another multidirectional key value. The system also includes one or more character sets 1214, such as the character sets shown in FIGS. 9 and 10. A character set chooser 1216 chooses a character set 1214 based at least in part on the specific value registered by the first multidirectional key register 1210.

A character chooser 1218 chooses a specific character based at least on part on the value registered by the second multidirectional key register 1210. A character reporter 1220 displays the character that was chosen by the character chooser. The character reporter 1220 may display the character on a display such as the display 220 of FIG. 2, may store the value in memory 120 (FIG. 1) for later display, may send the character along a communication connection 170 (FIG. 1) to another offsite computer, or the character may be displayed in a different way.

Example 6

Figure 13:
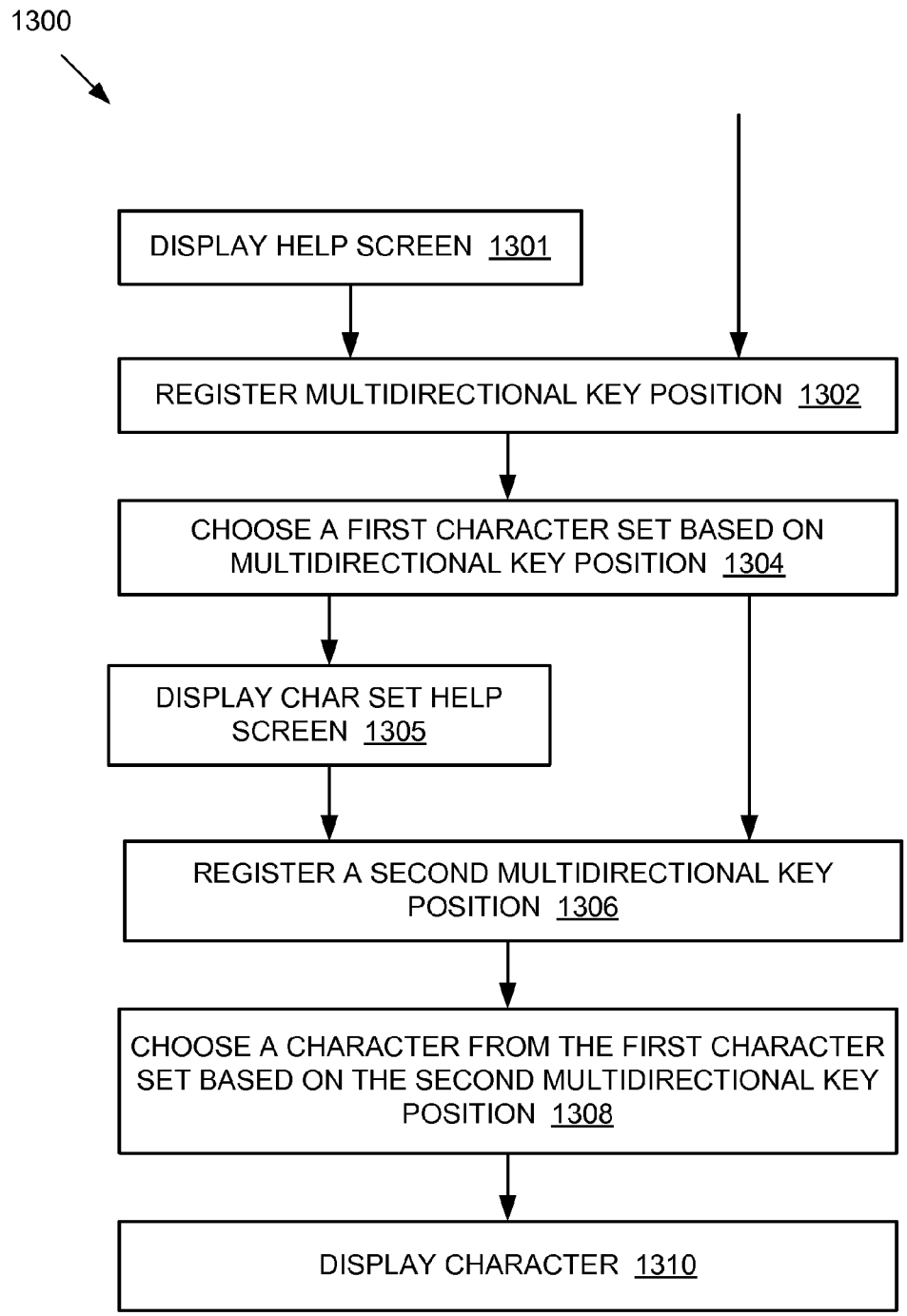
FIG. 13 is flow chart of an exemplary method to display characters using multidirectional keys.

Exemplary Method to Input and Display Characters Using Multidirectional Inputs FIG. 13 shows an exemplary method 1300 to input and display characters using multidirectional inputs. The method can be performed, for example, by the system 1200 of FIG. 12. Prior to the first multidirectional key position being registered, a help screen may be displayed 1301 that shows the sets of inputs that generate each of the allowable characters. An example of such a help screen is shown at 1400 (FIG. 14). At 1302, a multidirectional key position is registered. The key position may be registered based on the value of a multidirectional key such as any of those shown in FIG. 11. At 1304, a character set is chosen based on the multidirectional key position. For example, and with reference to FIG. 14, the English alphabet, common punctuation, and numbers are partitioned into five character sets 1405, 1410, 1415, 1420, 1425. In an exemplary embodiment, the multidirectional key position is registered based on which of four buttons is pushed. If no button is pushed, then character set 1 1405 is chosen. If a button marked by a circle is pushed, then character set 2 1410 is selected, and so forth.

At 1305, which is optional, a help screen can be displayed. Typically, this help screen will display the character set that has been chosen, along with which multidirectional key position will choose each character. The character set may be in an easy-to-read format such as the character set 1405 (FIG. 14).

At 1306, a second multidirectional key position is registered. At 1308, a character is chosen from the selected character set based at least in part on the registered position of the multidirectional key. At 1310, the selected character is displayed. This display may comprise writing the character to a file; displaying the character on a computer screen; sending the character across a network connection which may be a wireless connection; writing the character to a file; writing the character to an email; sending an aural version of the character, using, for example, a cell phone; displaying the character on the input device, such as is done with reference to FIG. 22, and so forth.

Example 7

Exemplary Character Set Input Using Three Input Values

Figure 15:
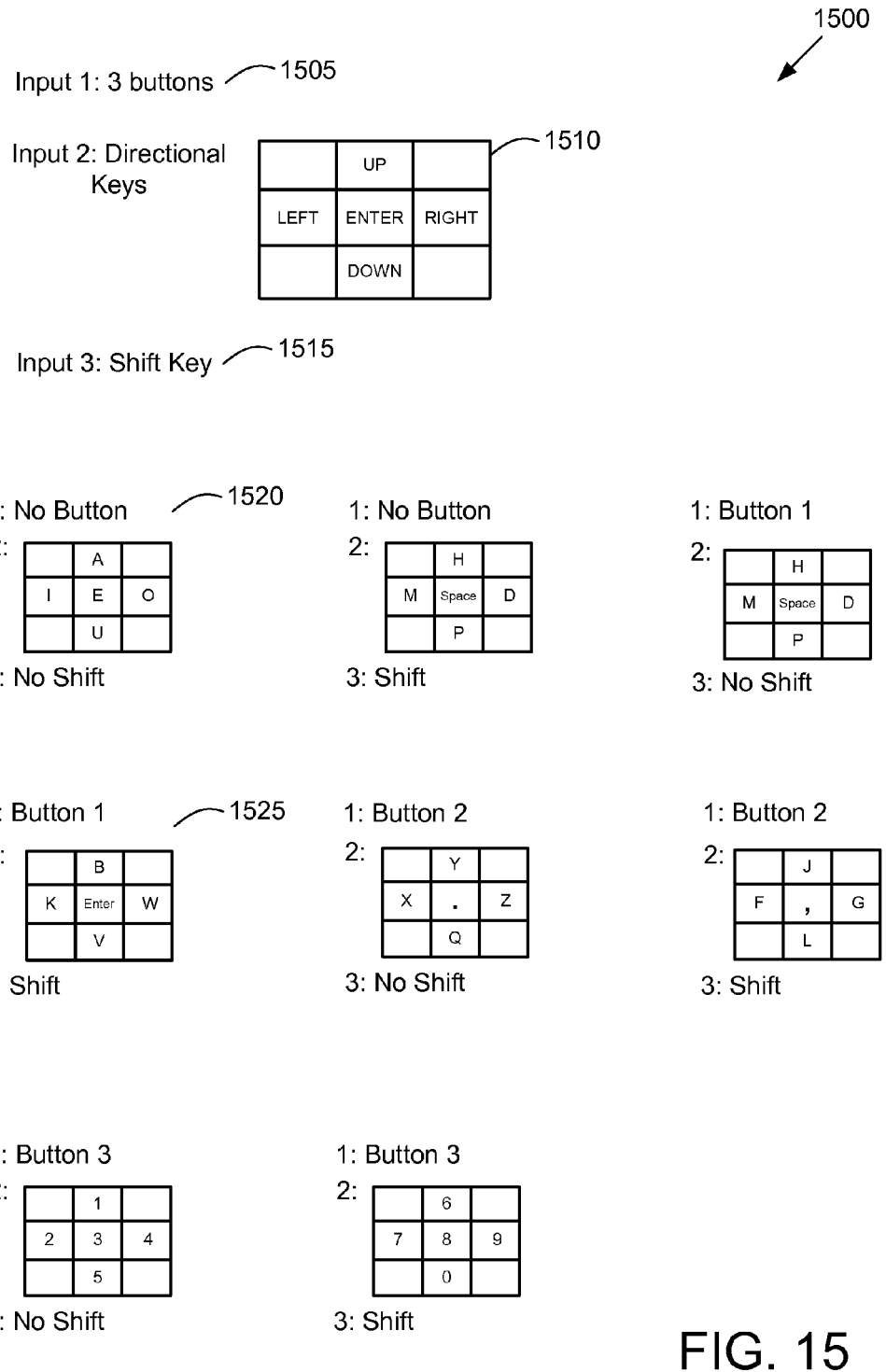
FIG. 15 is a block diagram of exemplary character sets that can be selected using three multidirectional keys inputs.

In an exemplary embodiment, inputting a character requires three input values. For example, the character set division 1500 shown in FIG. 15 requires using first multidirectional input with four values 1505, such as an array of three buttons (the fourth value can be "no button"), a second multidirectional input with five values 1510, preferably four directional keys (or a single multidirectional key that accepts directional inputs) and an input button, and a third input with two possible values 1515, which may be a key such as a shift key. To input a letter such as "a," as shown at 1520, none of the first multidirectional inputs 1505 is selected, the "up" directional key is chosen 1505, and the shift key is not depressed. The three values may be entered sequentially, may be entered simultaneously, or may be entered using a combination of simultaneous and sequential input.

Example 8

Figure 16:
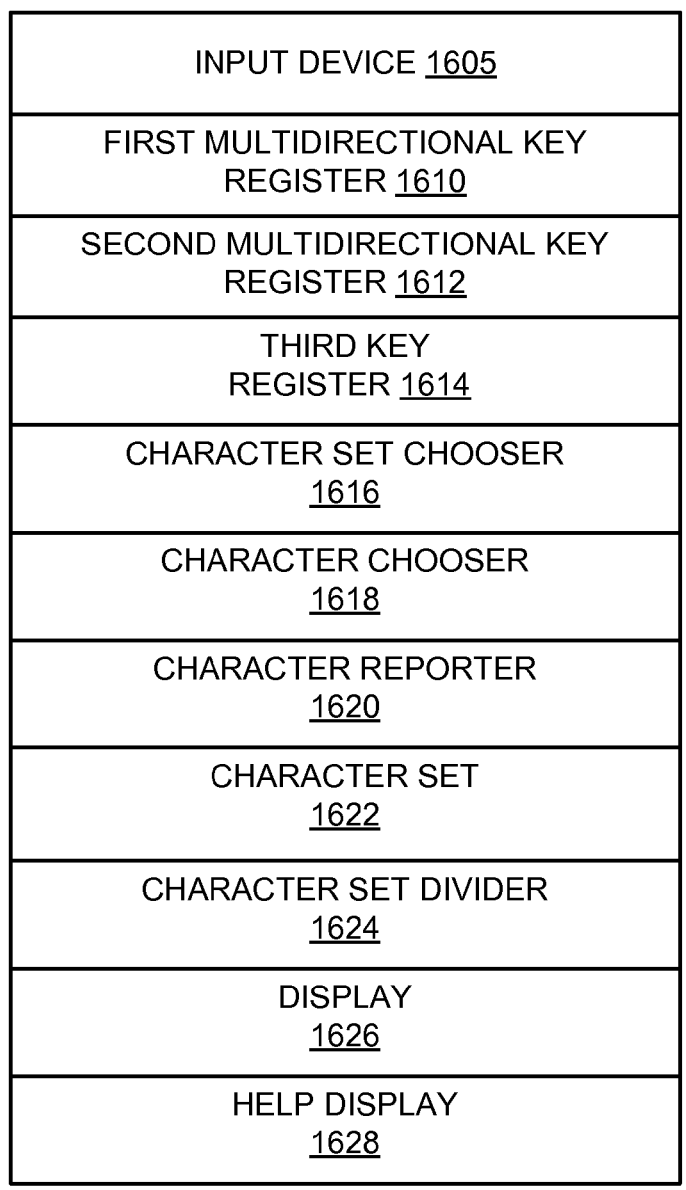
FIG. 16 is a block diagram of an exemplary system to input characters using multidirectional keys.

Exemplary System to Input and Display Characters Using Multidirectional Inputs FIG. 16 shows an exemplary system 1600 to input and display characters using at least three multidirectional input devices. An input device 1605 has a connection to a computer such as computing environment 100. A user will use this device 1605 to input at least three values that will be used to determine a character. A first multidirectional key register 1610 registers that a value has been chosen. The multidirectional key may be any of the multidirectional input devices discussed herein, such as the input devices described with reference to FIG. 11. As an example, an array of three buttons (which can provide up to four choices, with the fourth choice being "no button selected") or a multidirectional key that accepts three or more directional inputs can be used as the first multidirectional key input, which will have its value registered by the first multidirectional key register. A second multidirectional key register 1612 can be used to register another multidirectional key value. A third key 1614, which may be a multidirectional key, or may be a button, can be used as a third multidirectional key input, whose value will be registered by a third multidirectional key register 1614. A user can choose a value for the first, second and third multidirectional key inputs. The respective registers 1610, 1612, 1614, will then register which selections were chosen.

The system also includes one or more character sets 1622, such as the character sets shown in FIGS. 9 and 10. A character set chooser 1616 chooses a character set based at least in part on the specific value registered by the first mutivalue key register 1610. The character set chooser 1616 may also choose a character set based at least in part on the specific value registered by the second multidirectional key register 1612.

A character chooses 1618 chooses a specific character based at least on part on the value registered by the second multidirectional key register 1610. A character reporter 1620 displays the character that was chosen by the character chooser. The character reporter 1620 may display the character on a display such as the display 220 of FIG. 2, may store the value in memory 120 (FIG. 1) for later display, may send the character along a communication connection 170 (FIG. 1) to another offsite computer, or the character may be displayed in a different way.

Some embodiments may also include a character set divider 1624, which divides the possible characters that will be generated by the device into subsets (character sets) 1622 which can then be selected by, for example, the character set chooser 1616. Any method of dividing characters, including those taught in example 9, below, can be used to divide the character sets into characters.

Some embodiments may also include a display 1626, such as the display 220 (FIG. 2.) This display may be associated with a computer associated with the input device, may be associated with the device, may be a printer which causes the character to be print, and so forth. Embodiments may also include a help display. When a character set chooser 1610 chooses a character set, the possible characters that can be input may then be displayed alongside their input positions.

Figure 21:
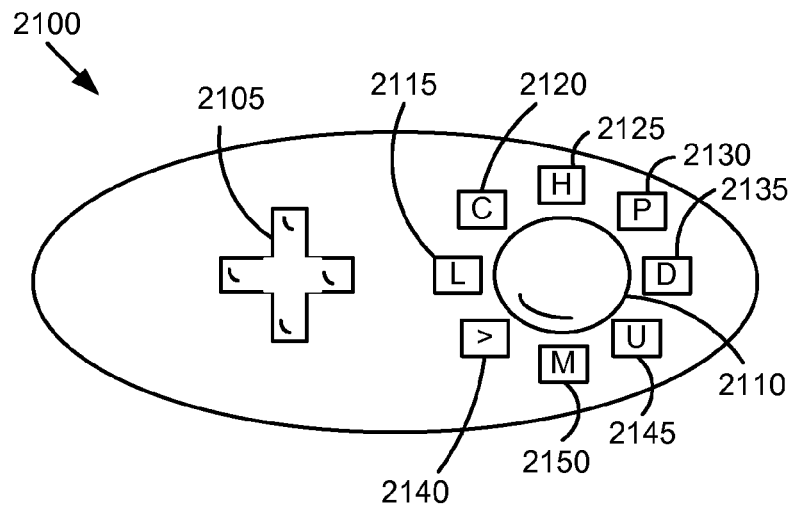
FIG. 21 is a diagram of an exemplary input device that displays possible characters that can be input when a character set is chosen.

FIG. 21 at 2100 shows a display device comprising a d-pad 2105, an analog stick 2110, and eight help displays (2115-2150) arranged around the corresponding analog stick positions. For example, on a device which uses the character sets shown in FIG. 14, when in text mode, if a specific d-pad input is registered, the help displays 2115-2150 would register the characters shown. That is, the character "H" would be displayed at 2125, the character "M" would be displayed at 2150, and so on. This would allow a user to know, for example, that selecting the W position of the analog stick 2110 would generate an "D" 2135. Selecting the SW position of the analog stick 2110 would generate a "U."

In another embodiment, a character set, such as the character set 1405 (FIG. 14) will be displayed on a primary display screen, such as a computer display screen associated with a computer environment 100 (FIG. 1) when the character set chooser 1618 chooses a specific character set.

Example 9

Exemplary Method to Divide Character Sets into Characters

In embodiments of the methods and systems taught herein, character sets may be divided into groups of characters, such as at 1624 (FIG. 16). Other embodiments include character sets in which the characters have been previously divided, such as 1304 (FIG. 13.) Within the character sets, the characters may be divided based on frequency with which they will be selected (e.g., the letters which occur with greater frequency, such as E, T, A, I, O, and N, should be able to be chosen by the user with greater ease (less finger-movement, for example) than those occur more infrequently, such as the characters K, Q, J, X, and Z.

Alternately, the characters may be divided based on ease of learning the relative positions, such that the letters that occur in an easy-to-remember pattern, such as appearing in order. Non-alphabetic systems may divide the characters (such as Chinese, Japanese, or Korean character sets) on different grounds, such as by the sound of the character, the number of strokes it takes to write the character, by the radical used in the character, by the order that the strokes are entered, by a combination of these methods, or by a different method. These may be used in any of the embodiments discussed herein.

Example 10

Exemplary Method to Input and Display Characters Using Multidirectional Inputs

Figure 17:
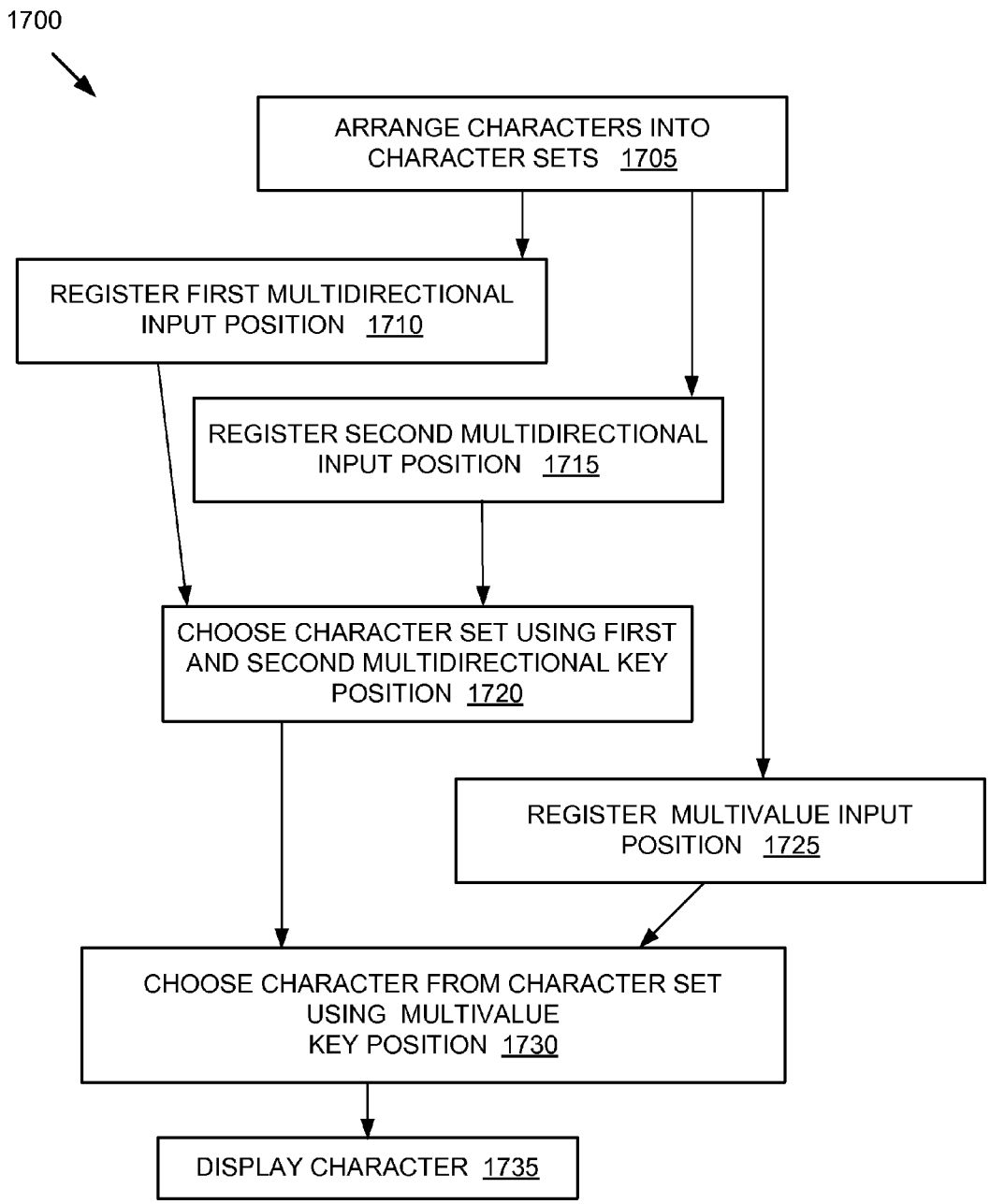
FIG. 17 is a flow chart of an exemplary method to display characters using multidirectional keys.

FIG. 17 shows an exemplary method 1700 to input and display characters using multidirectional inputs. The method can be performed, for example, by the system 1600 of FIG. 16.

At 1705, characters which can be displayed are arranged into character sets. These sets may be all be of the same size, or may be of different sizes. At 1710, a first multidirectional key position is registered. The key position may be registered based on the value of a multidirectional key such as any of those shown in FIG. 11. At 1715, a second multidirectional key position is registered.

At 1720, which is optional, the first and second character multidirectional keys positions can be used to select a character set. For example, and with reference to FIG. 15, the first multidirectional key position can be the three buttons 1505, with the second multidirectional key position being the shift key 1515. A user can choose those two values (by, e.g., pressing button 3, and not pressing the shift key). This can then select a character set (e.g., 1525, FIG. 15) which will allow a user to input a specific character from that set.

At 1725, a third input position is registered by the computer. This input position may be registered using a multidirectional key, a button, such as a shift button, or by a different input device. At 1730, a character is chosen from the character set previously chosen using the third multidirectional key position. To continue the previous example, a user then selecting the "down" directional key (the third multidirectional input) will choose the letter "V" from the character set 1525, while the user selecting the "up" directional key will choose the letter "B" from the character set 1525.

At 1735, the selected character is displayed. This display may comprise writing the character to a file, displaying the character on a screen, sending the character across a network connection which may be a wireless connection, and so forth.

Figure 18:
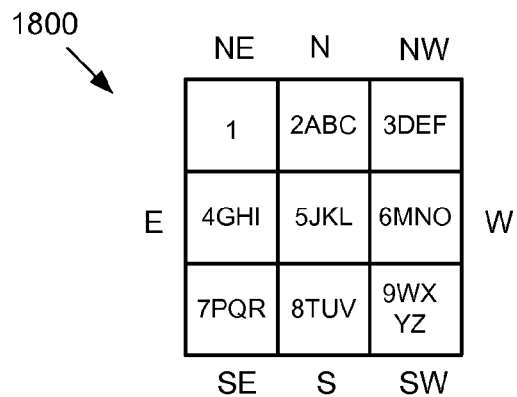
FIG. 18 is a block diagram of exemplary character sets that can be selected using one multidirectional key input.
Figure 19:
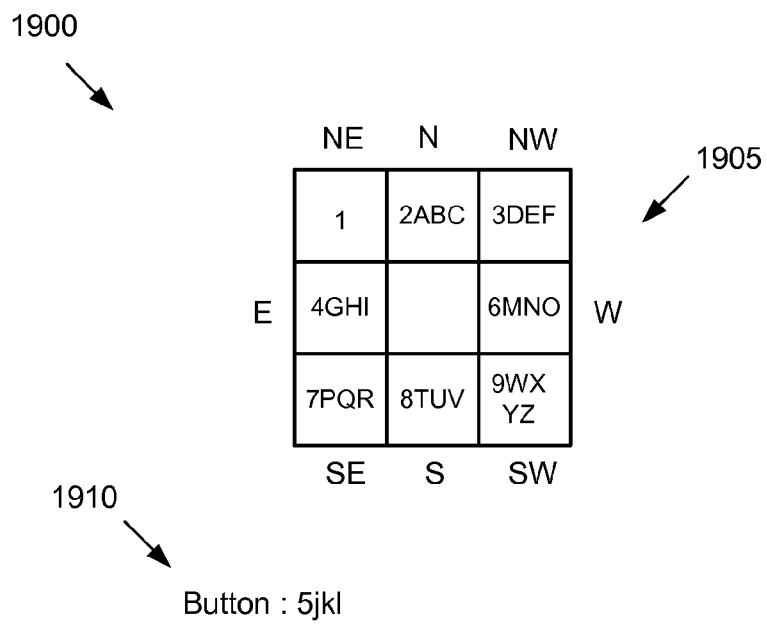
FIG. 19 is a block diagram of exemplary character sets that can be selected using two multidirectional keys inputs.
Figure 20:
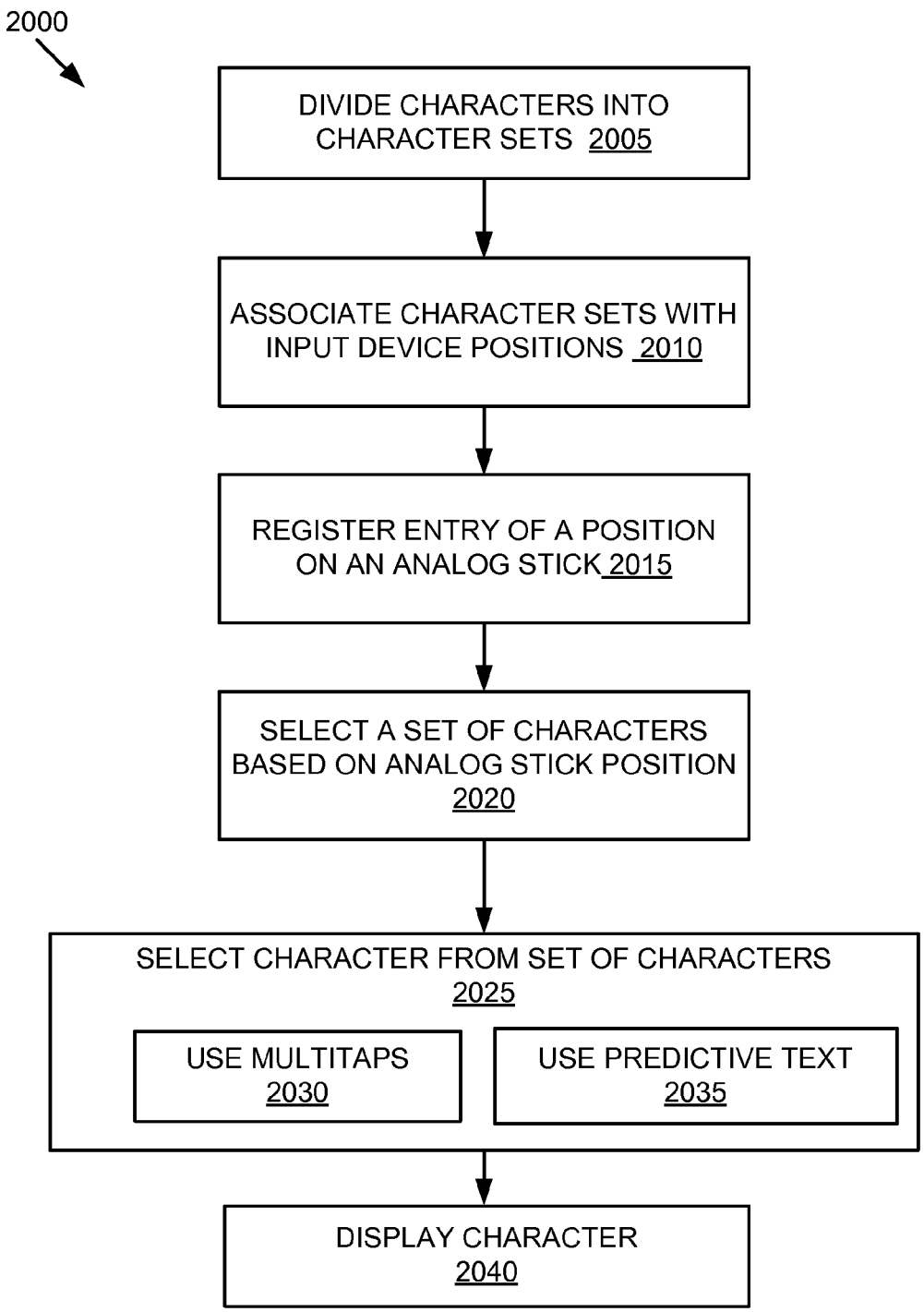
FIG. 20 is a flowchart of an exemplary method for using multidirectional keys to determine a character set and from there a character using multidirectional inputs.

At 2005, the desired characters that are to be entered may first be partitioned into a number of character sets. For example, and as shown in FIG. 18 at 1800, the alphabet and the numbers 1-9 can be divided into nine sets. At 2010, the character sets are then associated with input device positions. The nine sets shown at 1800 (FIG. 18) can be associated with the eight inputs of an analog stick or joystick (as shown in greater detail with reference to FIG. 4) and with an "enter" position associated with, generally, a straight downward press on the analog stick. FIG. 19 at 1900 shows associating the character sets with input positions using two multidirectional input devices, with eight sets 1905 being associated with an analog stick and one set 1910 (5jkl) being associated with another input device, such as a button. This character set association may be used, for example, with a system where the analog stick (or comparable device) does not have an input state.

The device is, at some point, triggered to accept character entry. This may be done automatically, at, for example, a certain point in a game, or may be done manually, by, for example, selecting a "text" button associated with the system, selecting a "text input" portion of a screen, selecting a menu, and so on. Some input devices may have an analog stick that is used exclusively for character input.

A user pushes the analog stick into a position. Then, at 2015, entry of a position of the analog stick is registered. At 2020, a set of characters (e.g., one character set, such as "2ABC" within the character sets 1800, 1900) is selected.)

At 2025, a character is selected from the chosen character set. This selection can be done using predictive text methods 2035, can be done using multitap methods 2030, or a different method can be used. Predictive text and multitap methods, such as those that are commonly known and/or commercially available can be used.

If predictive text 2035 (such as a commercially available program, e.g., T9, EZTap, multitap, iTap, AdapText, TenGO etc.) is used, then after a user selects the character set, a computer program will determine which character of those in the set is the most likely to be chosen. In some embodiments, word-completion, where the most probable word is guessed, is also provided. Embodiments also include the ability to cycle through words whose input produces more than one word—textonyms. For example, choosing set 6 and set 3 can produce both "of" and "me". The user would then cycle through the textonyms and choose the one desired. In embodiments, phrases as well as single words can also be automatically completed. For example, typing (or otherwise selecting) "sincer" could bring up the phrase "sincerely yours." Typing "Mis" could bring up the phrase "mission accomplished," and so forth. In at least one embodiment, a predictive text program such as Q9 is used to input non-English characters.

In another embodiment, certain commonly used phrased can be input using specific character inputs. For example, "Mission Accomplished" could be input by typing "MI." Some embodiments allow users to input words and phrases and their specific character input.

If the multitap method is used, then the user can tap the analog stick (or the input device) a number of times, each tap will cycle through the possible characters within the set. For example, if a "C" is desired, the user can tap the analog stick in the "North" direction four times.

In certain embodiments, if the predictive text 2035 is used initially, and does not produce the correct input, the multitap method may be used instead, producing more accurate, albeit slower, input.

At optional 2040, the chosen character is displayed. This display may comprise writing the character to a file, displaying the character on a screen, sending the character across a network connection which may be a wireless connection, using the character to calculate a value, with the value then being displayed, and so forth. In an exemplary embodiment, the character is displayed on a computer screen.

Figure 22:
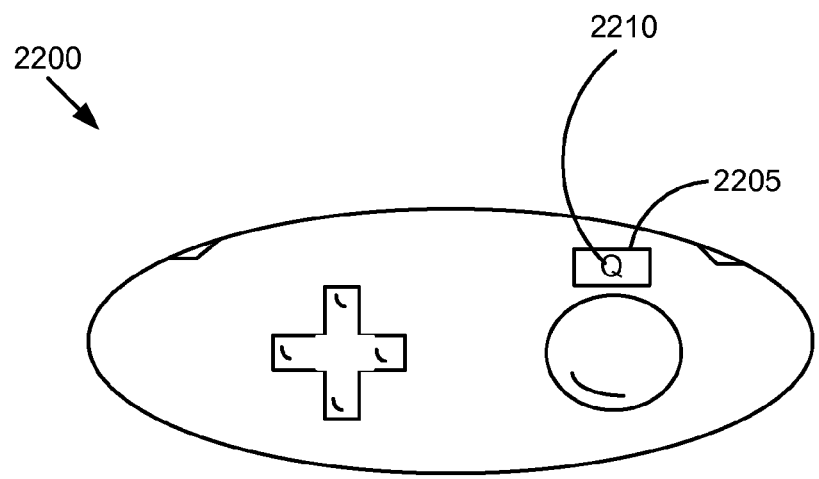
FIG. 22 is a diagram of an exemplary input device that displays a character when input.

At optional 2045, the chosen character is displayed on a secondary device, which may be the input device. For example, certain devices may not have computer screens, etc., which allow the user to see what has been input. Such devices, may instead be equipped with a display just big enough for one character. Other devices may allow 2 or more characters. The character may display for a predetermined time (such as 1 second) or may display until another character is chosen. This allows a user some feedback that the correct characters have been entered, and, in some embodiments, allows a user to self-correct. If an incorrect letter is displayed, the user can erase, and try again. For example, FIG. 22 shows an input device 2200 with a character display 2205 large enough to display one character—a "Q" 2210 in the example.

Example 11

Predictive Text Embodiments

In input programs which use predictive text, such as, for example the commercially available programs, e.g., T9, EZTap, multitap, iTap, AdapText, TenGO etc.) the multidirectional input methods and systems, such as the method shown in FIG. 12, and the system shown in FIG. 13, can be used as the front end to enter the textual input.

Example 12

Language Embodiments

The characters input using the embodiments taught herein, such as the character set 1214 (FIG. 12) and individual characters are not limited by the type of character, or the language (or languages) that are being input. So, for example, Arabic, Cyrillic, Thai, Vietnamese, Hindi, Urdu, and non-alphabetic systems such as the various Japanese and Chinese character systems, Korean, and so forth can all be input using embodiments taught herein.

Example 13

Methods in Computer-Readable Media

Any of the methods described herein can be performed via one or more computer-readable media (e.g., storage media) having computer-executable instructions for performing such methods.

Example 14

Exemplary Alternatives

In view of the many possible embodiments to which the principles of the disclosed technology may be applied, it should be recognized that the illustrated embodiments are only preferred examples of the technology and should not be taken as limiting the scope of the following claims. I, therefore, claim as my invention all that comes within the scope and spirit of these claims.

I claim:

1. A computer-implemented method for displaying a character on a computing device comprising:
    registering a first multidirectional key position of a first multidirectional key, the first multidirectional key having at least five possible first multidirectional key positions, wherein the possible first multidirectional key positions comprise a no-button-is-pushed position;
    based at least on which of the possible first multidirectional key positions is detected, choosing at least one character set from at least five possible character sets, wherein the no-button-is-pushed position results in choosing from the possible character sets, at least one of the possible character sets has eight or more characters, and the possible first multidirectional key positions correspond to respective of the possible character sets;
    registering a second multidirectional key position of a second multidirectional key, the second multidirectional key having at least eight positions, wherein the positions of the second multidirectional key comprise at least one diagonal position;
    choosing at least one character from the chosen character set based at least in part on the second multidirectional key position; and
    displaying the chosen character on the computing device.

2. One or more computer-readable storage media not consisting of a signal and having computer-executable instructions for performing a method for displaying a character on a computing device comprising:
    registering a first multidirectional key position of a first multidirectional key, the first multidirectional key having at least five possible first multidirectional key positions, wherein the possible first multidirectional key positions comprise a no-button-is-pushed position;
    based at least on which of the possible first multidirectional key positions is detected, choosing at least one character set from at least five possible character sets, wherein the no-button-is-pushed position results in choosing from the possible character sets, at least one of the possible character sets has eight or more characters, and the possible first multidirectional key positions correspond to respective of the possible character sets;
    registering a second multidirectional key position of a second multidirectional key, the second multidirectional key having at least eight positions, wherein the positions of the second multidirectional key comprise at least one diagonal position;
    choosing at least one character from the chosen character set based at least in part on the second multidirectional key position; and
    displaying the chosen character on the computing device.

3. The method of claim 1 wherein the second multidirectional key position is registered using an analog stick.

4. The method of claim 1 wherein the first multidirectional key is one of a d-pad, two or more shoulder buttons, one or more button arrays, one or more multidirectional buttons, or an analog stick.

5. The method of claim 1 further comprising, after choosing at least one character set from the at least five possible character sets, displaying characters associated with the second multidirectional key positions on the computing device.

6. The method of claim 1 wherein the first multidirectional key positions of the at least five possible character sets are arranged at least in part, to minimize user finger movement when choosing characters that occur with greater frequency.

7. The method of claim 1 further comprising at least three multidirectional keys, and wherein the choosing at least one character from the chosen character set based at least in part on the second multidirectional key position further comprises choosing the at least one character from the chosen character set based at least in part on a third key position.

8. The method of claim 1 wherein the choosing at least one character from the chosen character set based at least in part on the second multidirectional key position further comprises choosing the at least one character from the chosen character set based at least in part on a state of at least one button separate from the first multidirectional key and the second multidirectional key.

9. The method of claim 1 further comprising:
dividing possible characters into the at least five possible character sets, the at least five possible character sets each comprising multiple characters.

10. The method of claim 9 wherein the possible characters comprise an alphabet.

11. The method of claim 1 wherein the displaying the character on the computing device comprises writing the character to a file.

12. The method of claim 1 wherein the displaying the character on the computing device comprises displaying the character on a game display.

13. A computer-implemented system for implementing character entry comprising:
a first multi-choice input mechanism having at least three possible first multidirectional key positions, wherein the possible positions comprise a no-button-is-pushed position;
a second multi-choice input mechanism having at least eight positions, wherein the positions of the second multi-choice input mechanism comprise at least one diagonal position;
a register device for registering that a choice has been registered on the first and second multi-choice input mechanisms; and
a selector which selects a character set out of possible character sets based on a choice registered on the first multi-choice input mechanism, based at least on which of the possible first multidirectional key positions is detected, wherein the no-button-is-pushed position chooses from the possible character sets, and the possible first multidirectional key positions correspond to respective of the possible character sets, and wherein the selector selects a character from the character set based at least on a choice registered on the second multi-choice input mechanism.

14. The computer-implemented system of claim 13 wherein the character represents a phrase.

15. The computer-implemented system of claim 13 further comprising a displayer which displays the character.

16. The computer-implemented system of claim 15 further comprising a second displayer which displays the character.

17. The computer-implemented system of claim 13 further comprising a displayer which displays a phrase associated with the character.

18. The computer-implemented system of claim 13 wherein the first multi-choice input mechanism is one of an array of buttons, a dance pad, a rocker button, a joystick, an analog stick, a paddle, a trackball, a keypad, a motion controller, or a musical instrument.

19. One or more computer-readable storage media not consisting of a signal and having computer-executable instructions for performing a method of selecting a character on a computing device, the method comprising:
registering a first multidirectional key position of a first multidirectional key, the first multidirectional key having at least five possible first multidirectional key positions, wherein the possible first multidirectional key positions comprise four button-is-pushed positions and a no-button-is-pushed position;
based at least on which of the possible first multidirectional key positions is detected, choosing at least one character set from at least five possible character sets, wherein the no-button-is-pushed position chooses from the possible character sets, the possible first multidirectional key positions correspond to respective of the possible character sets, and a single position of the possible first multidirectional key positions is sufficient to select any of the possible character sets;
registering a second multidirectional key position of a second multidirectional key, the second multidirectional key having at least eight positions, wherein at least one of the at least eight positions is a diagonal position;
choosing at least one character from the chosen character set based at least in part on the second multidirectional key position; and
outputting the at least one chosen character on the computing device.

20. The computer-readable storage media not consisting of a signal of claim 19 wherein the method further comprises:
receiving a position of a third key; and
selecting from the possible character sets based at least on the position of the third key.

21. The computer-readable storage media not consisting of a signal of claim 19 wherein:
characters of the possible character sets are divided based on frequency of selection.

* * * * *